(12) United States Patent
Pletz et al.

(10) Patent No.: US 11,358,839 B2
(45) Date of Patent: *Jun. 14, 2022

(54) PIPELAYER MACHINE WITH SYMMETRICAL WINCHES

(71) Applicant: Brandt Industries Canada Ltd., Regina (CA)

(72) Inventors: Michael Pletz, Regina (CA); Daniel Klassen, Regina (CA)

(73) Assignee: Brandt Industries Canada Ltd., Regina (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/992,190

(22) Filed: Aug. 13, 2020

(65) Prior Publication Data
US 2021/0061619 A1    Mar. 4, 2021

Related U.S. Application Data

(63) Continuation of application No. 15/815,897, filed on Nov. 17, 2017, now Pat. No. 10,773,931.
(Continued)

(30) Foreign Application Priority Data

Jul. 21, 2017  (CA) .................................. CA 2974274
Oct. 26, 2017  (CA) .................................. CA 2983835

(51) Int. Cl.
*B66C 1/00*       (2006.01)
*B66C 1/44*       (2006.01)
(Continued)

(52) U.S. Cl.
CPC .............. *B66C 1/442* (2013.01); *B66C 23/42* (2013.01); *B66C 23/44* (2013.01); *B66C 25/00* (2013.01);
(Continued)

(58) Field of Classification Search
CPC ....... B66C 23/06; B66C 23/08; B66C 23/365; B66C 23/46; B66C 23/76; B66C 1/442;
(Continued)

(56) References Cited

U.S. PATENT DOCUMENTS 2,425,663 A * 8/1947 Wooldridge ............ B66C 23/44
                                                  212/288
4,310,098 A    1/1982 Dirksen
(Continued)

OTHER PUBLICATIONS

Canadian Office Action dated Nov. 23, 2018 for Application No. CA 2,983,835, 4 pgs.

*Primary Examiner* — Emmanuel M Marcelo
(74) *Attorney, Agent, or Firm* — Frost Brown Todd LLC; Nicole M. Tepe (57) ABSTRACT

A pipelayer machine is provided. The pipelayer machine has a main body, a boom pivotally connected to a first side of the main body, a hook winch provided on the first side of the main body and a boom winch provided on the second side of the main body. The boom winch and the hook winch can be connected to a structural assembly that positions the boom winch proximate the second side of the main body and positions the hook winch proximate the first side of the main body of the pipelayer machine. The hook winch can be provided in a hook winch frame and the hook winch frame can form a structural member in the structural assembly.

17 Claims, 9 Drawing Sheets

Related U.S. Application Data (60) Provisional application No. 62/536,596, filed on Jul. 25, 2017.

(51) Int. Cl.

| | | |
|---|---|---|
| *B66C 23/42* | (2006.01) | |
| *B66C 23/44* | (2006.01) | |
| *B66C 25/00* | (2006.01) | |
| *E03F 3/06* | (2006.01) | |
| *E21B 19/15* | (2006.01) | |
| *F16L 1/11* | (2006.01) | |
| *F16L 1/036* | (2006.01) | |

(52) U.S. Cl.
CPC .............. *E03F 3/06* (2013.01); *E21B 19/15* (2013.01); *F16L 1/11* (2013.01); *B66D 2700/01* (2013.01); *F16L 1/036* (2013.01)

(58) Field of Classification Search
CPC ... E03F 3/06; F16L 1/036; F16L 1/065; E02F 5/08
See application file for complete search history.

(56) References Cited

U.S. PATENT DOCUMENTS

| | | | |
|---|---|---|---|
| 5,332,110 A * | 7/1994 | Forsyth | B66C 23/44 |
| | | | 212/196 |
| 5,992,655 A | 11/1999 | Greenberg et al. | |
| 6,000,563 A | 12/1999 | Greenberg | |
| 7,845,503 B2 | 12/2010 | Laurini | |
| 10,220,921 B1 | 3/2019 | McConnell | |
| 10,773,931 B2 * | 9/2020 | Pletz | B66C 23/44 |
| 2003/0015488 A1 | 1/2003 | Forsyth | |
| 2006/0245888 A1 * | 11/2006 | Dietz | B66C 23/44 |
| | | | 414/563 |
| 2009/0084748 A1 * | 4/2009 | Styck | B66C 23/44 |
| | | | 212/258 |
| 2009/0087266 A1 * | 4/2009 | Styck | B66C 23/44 |
| | | | 405/154.1 |
| 2010/0108632 A1 * | 5/2010 | Davis | B66C 23/44 |
| | | | 212/294 |
| 2011/0084044 A1 | 4/2011 | Camacho et al. | |
| 2011/0094987 A1 | 4/2011 | Botwright et al. | |
| 2012/0325998 A1 | 12/2012 | Nunley | |
| 2013/0026431 A1 | 1/2013 | Uemura et al. | |
| 2014/0252285 A1 * | 9/2014 | Genoe | B66C 23/44 |
| | | | 254/280 |
| 2016/0060082 A1 | 3/2016 | Huang et al. | |
| 2016/0169413 A1 | 6/2016 | Camacho et al. | |
| 2016/0207744 A1 * | 7/2016 | Uemura | B66D 1/36 |
| 2019/0031474 A1 | 1/2019 | Stilborn et al. | |
| 2019/0033158 A1 | 1/2019 | Bonnet et al. | |
| 2019/0337776 A1 | 11/2019 | Fanello | |

* cited by examiner

PIPELAYER MACHINE WITH SYMMETRICAL WINCHES

CROSS-REFERENCE TO RELATED APPLICATIONS

This application is a continuation of U.S. patent application Ser. No. 15/815,897, which claims priority to and benefit of CA Serial No. 2,974,274, filed Jul. 21, 2017; U.S. Provisional Application Ser. No. 62/536,596, filed Jul. 25, 2017 and CA Serial No. 2,983,835, filed Oct. 26, 2017, the contents of each are incorporated by reference in their entirety for all purposes.

FIELD OF THE INVENTION

The present invention relates to a pipelayer machine and more particularly to the placement of winches on a work tool frame on pipelayer machines.

BACKGROUND

A pipelayer machine is a machine that is specially designed to lay sections of pipe in a trench to create a pipeline. Previously, cranes had been used to raise up pipe sections and lower them into a trench. However, the cranes were not very maneuverable and were commonly modified from cranes designed for other purposes to be used for installing the pipe sections in the trench. Eventually, excavators and crawlers began to be used for installing pipe sections with kits being made and sold to convert an excavator or crawler over for pipe installation duty. Eventually, purpose-made pipelayer machines were designed the sole purpose of which was the installation of pipe section in a pre-made trench.

A pipelayer machine will typically have tracks and a crawler body with an engine. A side boom can extend to one side of the pipelayer machine and the raising and lowering of the side boom is handled by a boom winch. A counterweight assembly is typically provided on an opposite side of the pipelayer machine from the side that the boom is attached to in order to balance out the pipelayer machine and prevent it from tipping when the boom is used to raise and lower a pipe section into a trench.

A hook winch, hook cable and hook are used to pick up and raise a load, such as a section of pipe. The hook winch winds and unwinds the hook cable, which is connected to the hook and is suspended from the end of the boom.

These pipelayer machines are used to lay pipe in a trench by using the tracks to maneuver the pipelayer machine next to a trench the pipe section will be placed in. The hook cable and hook are used with the boom to connect to the pipe section and the hook winch is used to raise the pipe section from the ground. Then, using the boom, the pipelayer machine moves the pipe section over the trench and lowers the pipe section into the trench. Commonly, a number of pipelayer machines will be used at the same time to raise and lower the pipe section into the trench with a number of the pipelayer machines working in unison to raise and lower a single pipe section.

Typically, conventional prior art pipelayer machines will position both the boom winch, which controls raising and lowering the boom, and the hook winch, which raises and lowers the hook suspended from the boom, adjacent to each other on the opposite side of the pipelayer machine that the boom is attached to. This places both winches on the same side of the pipelayer machine that the counterweight assembly is attached to. There are a number of reasons for placing the hook winch on this side of the pipelayer machine, including that having the weight of the hook winch on the opposite side of the pipelayer machine from the side the boom is attached to will help to prevent the pipelayer machine from tipping from the weight of a raised pipe, because the weight of the hook winch will counteract the tipping forces applied to the pipelayer machine by the load suspended from the boom.

While placing the hook winch on the opposite side of the pipelayer machine that the boom is attached to does provide some benefits, there are also problems created by placing the hook winch on this side of the pipelayer machine. With the hook winch provided on the same side of the pipelayer machine as the boom winch, the hook cable typically runs substantially horizontally across the pipelayer machine, between the cab of the pipelayer machine and an engine enclosure of the pipelayer machine, to a fairlead sheave provided on the same side of the pipelayer machine as the boom. After the hook cable passes through the fairlead sheave, it is angled upwards to run to a load block attached to the end of the boom and then down to the hook block and hook. The fairlead sheave prevents the hook cable from getting tangled with the boom or in the tracks of the pipelayer machine, but the fairlead sheave can also cause a high fleet angle on the hook cable which can prevent it from reeving onto the drum of the hook winch properly when the hook winch is winding up the hook cable and raising the hook block and hook.

The fleet angle is the angle of the hook cable coming off/on a winch drum and onto a pulley or a sheave. Looking downwards as the hook cable spools on or off the drum of the hook winch, the fleet angle is the angle that the hook cable varies from being perpendicular to the winch drum. When there is a direct line between the fairlead sheave and the hook winch, the hook cable will be perpendicular to the winch drum and the fleet angle of the hook cable will be 0. However, as the hook cable is wound or unwound around the winch cable and the point where the hook cable winds around the drum moves further to one side or the other of the winch drum, the fleet angle of the hook cable will increase. Typically, the fairlead sheave is positioned so that it is aligned with a centerline of the drum of the hook winch. In this manner, the distance to either end of the hook drum from the centerline (where the fleet angle of the hook cable is 0) is equal; minimizing the fleet angle in both directions. The fleet angle of the hook cable will be large if the ratio of the distance between the centerline of the drum (where the fairlead sheave is aligned) to one of the outside ends of the drum is relatively large and the distance between the hook winch and the fairlead sheave is relatively short. Because the distance between the hook winch and the fairlead sheave is relatively short (just the width of the pipelayer machine), and the fairlead sheave is fixed in one position, the fleet angle of the hook cable can be quite large when it is being wound onto the outer edges of the winch drum in these conventional pipelayer machine designs.

A good fleet angle is between 0.5° to 1.5° of rope angle. If the fleet angle is too large, the hook cable may not reeve on to the drum of the hook winch evenly. In some cases it can even "birdcage" which occurs when the cable has fouled on the drum with overriding turns, locking the hook cable in place on the drum and preventing the hook cable from further unwinding from the hook winch. Birdcaging the hook cable can cause permanent damage to the hook cable by kinking the hook cable and even ruining it so it can no longer be used.

This reeving problem can be increased in pipelayer machines with closed cabs where an operator does not have access to the winch to fix the bird caging without stopping the machine and leaving the cab.

Additionally, the room for the hook cable to run between the cab of the pipelayer machine and the engine enclosure is limited, limiting the length of drum winch that can be used on the hook winch. Using a shorter drum winch can limit how much cable the hook winch can hold and still have enough torque to winch in the cable. The amount of force applied to winching in the cable decreases every time another layer of cable is added to the winch drum.

Additionally, winches are large, heavy, and costly components which are subject to wear and tear during the use of the pipelayer machine. When these winches require maintenance or replacement, it can require significant amounts of time and labor to remove and reinstall the winches on the pipelayer machine.

BRIEF SUMMARY

In a first aspect, a pipelayer machine is provided. The pipelayer machine can include a main body having a first side and a second side, a first side track provided on the first side of the main body, a second side track provided on the second side of the main body, a side boom having a distal end and a proximal end, the proximal end of the side boom pivotally attached to the first side of the main body, a boom winch provided proximate the second side of the main body, a boom cable running between the boom winch and the distal end of the boom, the boom cable and boom winch operative to raise and lower the boom; a hook winch provided proximate the first side of the main body; and a hook cable running between the hook winch to the distal end of the boom and to a hook suspended from the distal end of the boom.

In a further aspect, the boom winch and the hook winch are connected to a structural assembly and the structural assembly positions the boom winch proximate the second side of the main body and positions the hook winch proximate the first side of the main body of the pipelayer machine.

In a further aspect, the hook winch is provided in a hook winch frame and the hook winch frame forms a structural member in the structural assembly.

In another aspect, a structural assembly for positioning a hook winch and a boom winch on opposite sides of a pipelayer machine is provided. The structural assembly includes a first side track frame connectable inside a first side track of the pipelayer machine, a link mount operatively connected to the first side track frame, a hook winch frame for supporting a hook winch, the hook winch frame connected at a first side to the link mount, a work tool frame is connected at a first end to a second side of the hook winch frame and positioned to extend across a main body of the pipelayer machine and a second side track frame connectable inside a second side track of the pipelayer machine and a second end of work tool frame.

BRIEF DESCRIPTION OF THE DRAWINGS

A preferred embodiment of the present invention is described below with reference to the accompanying drawings, in which.

DETAILED DESCRIPTION OF THE ILLUSTRATED EMBODIMENTS

Figure 1:
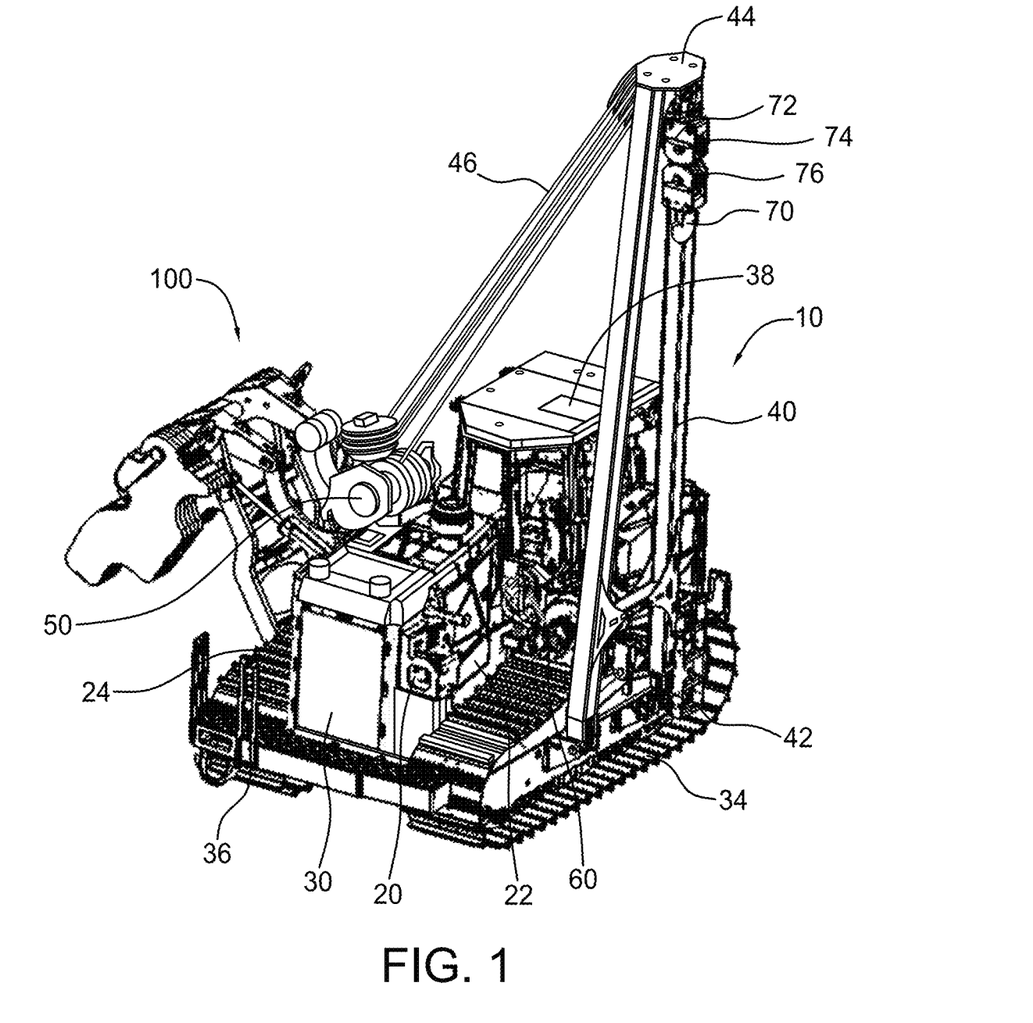
FIG. 1 is a perspective view of a pipelayer machine.
Figure 2:
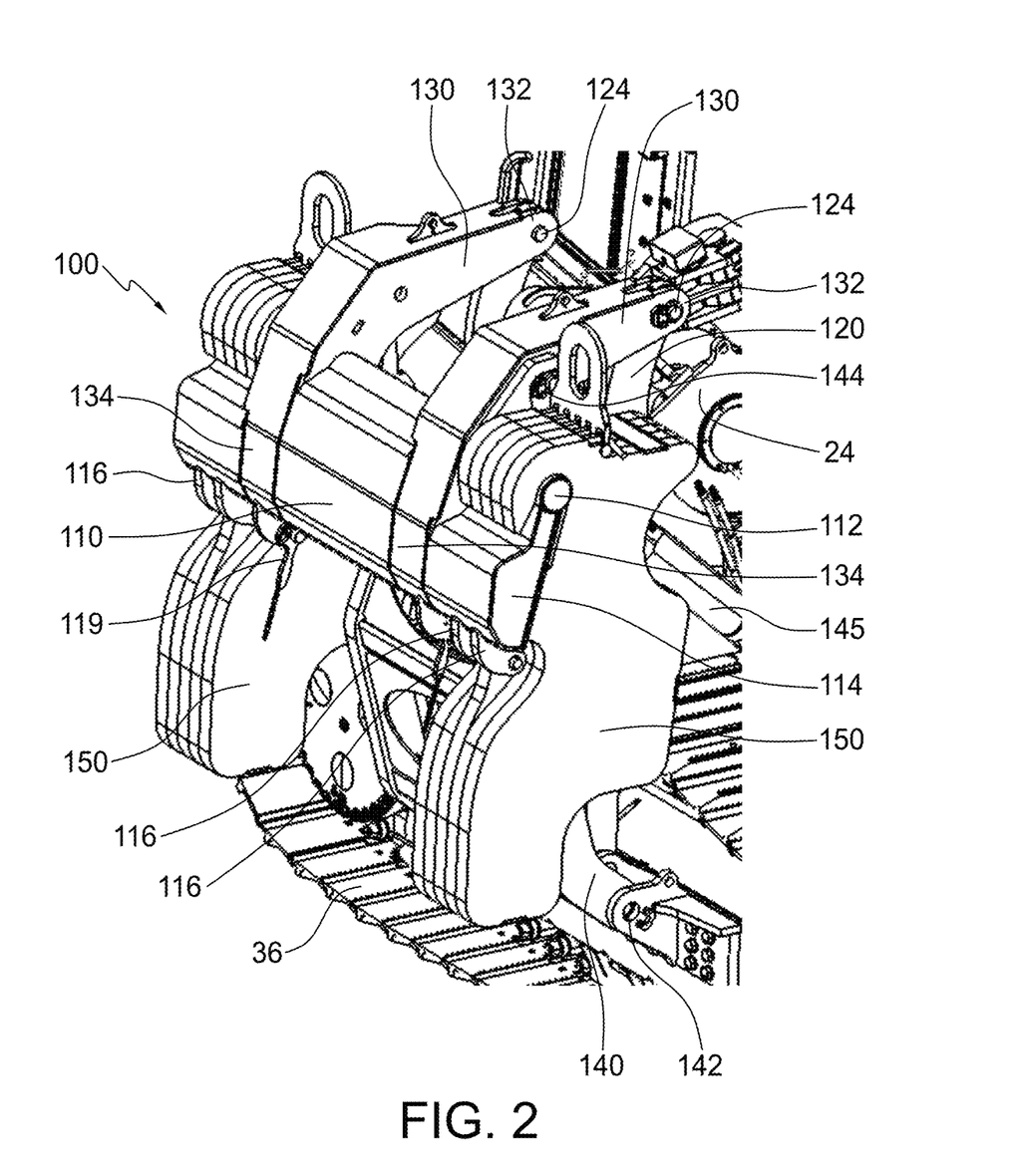
FIG. 2 is a front view of the pipelayer machine of FIG. 1.

FIGS. 1 and 2 illustrate a pipelayer machine 10 for placing sections of pipe section in a trench. The pipelayer machine 10 can include a main body 20, an engine 30, a first side track 34, a second side track 36, a cab 38, a side boom 40, a counterweight assembly 100, a boom winch 50, a hook winch 60 and a hook 70.

The main body 20 can have a first side 22 and a second side 24 and hold the engine 30 and the pair of tracks 34, 36. The cab 38 is provided for an operator to sit and control the operation of the pipelayer machine 10.

The side boom 40 is used to support a pipe section that is lifted off of the ground by the pipelayer machine 10 and to move the pipe section laterally away from the pipelayer machine 10 over top of the trench so that the pipe section can be lowered by the pipelayer machine 10 into the trench. The side boom 40 can be pivotally connected at a proximal end 42 of the side boom 40 to a first side 22 of the main body 20 of the pipelayer machine 10 so that the side boom 40 extends laterally from the first side 22 of the main body 20. In one aspect, the proximal end 42 of the side boom 40 can be connected inside the first side track 34 on the first side 22 of the main body 20 so that the first side track 34 rotates around the proximal end 42 of the side boom 40.

In one aspect, the side boom 40 can have a triangular frame.

The boom winch 50 can be used to raise and lower the side boom 40. The boom winch 50 can be operatively attached to a distal end 44 of the boom 40 by a boom cable 46. The boom winch 50 can be attached to the main body 20 of the pipelayer machine 10 on the second side 24 of the main body 20 of the pipelayer machine 10 so that the boom cable 46 passes between the boom winch 50 and the distal end 44 of the side boom 40 in front of the cab 38 of the pipelayer machine 10.

The boom winch 50 can be wound to raise the boom 40 around its pivotally connected proximal end 42 or unwound to lower the boom 40 around the pivotally connected proximal end 42. Typically, the boom cable 46 is used in conjunction with a block and tackle assembly to increase the force applied to the boom 40 by the boom winch 50 to aid the boom winch 50 in raising the boom 40.

The hook winch 60 and hook 70 can be used to raise and lower a pipe section. The hook winch 60 can be connected to the hook 70 with a hook cable 72 and the hook winch 60 can be wound to raise the hook 70 and thereby any pipe section attached to the hook 70 or unwound to lower the hook 70. Typically, the hook cable 72 is used with a load block 74 and a hook block 76 which the hook 70 is attached to in order to increase the force the hook winch 60 can apply to a pipe section suspended from the hook 70 with the load block 74 attached to the distal end 44 of the boom 40. The hook cable 72 can run through the load block 74 and down to the hook block 76 before running back up to the load block 74. The hook cable 72 may pass back and forth between the load block 74 and the hook block 76 depending upon the amount of force multiplication desired.

The counterweight assembly 100 is connected to the second side 24 of the main body 20 on an opposite side of the main body 20 from the first side 22. The counterweight assembly 100 is used to counterbalance the forces applied to the pipelayer machine 10 created when the pipelayer machine 10 lifts a pipe section off of the ground and moves it outwards laterally from the pipelayer machine 10 using the boom 40 to position the pipe section over a trench. The counter weight assembly 100 uses counterweights 150 and can move these counterweights 150 laterally away from the second side 24 of the main body 20 of the pipelayer machine 10 as the pipe section is picked up and move laterally away from the first side 22 of the main body 20 of the pipelayer machine 10.

The hook winch 60 is provided on the first side 22 of the main body 20 of the pipelayer machine 10; the same side of the main body 20 of the pipelayer machine 10 that the boom 40 is attached to. In one aspect, the hook winch 60 can be positioned substantially where the fairlead sheave would be placed on prior art devices and the winch cable 72 can run directly between the hook winch 60 and the load block 74 suspended from the distal end 44 of the boom 40 without a fairlead sheave placed in between to alter the direction of the hook cable 72. In this manner, the hook cable 72 will run directly between the hook winch 60 and the distal end 44 of the boom 40 uninterrupted without contacting any other component like a fairlead sheave that alters the direction of the hook cable 72.

Because of the length of the boom 40, the fleet angle of the hook cable 72 as it runs between the hook winch 60 and the load block 74 is much better than conventional pipelayer machines using a fairlead sheave since the distance between the load block 74 and the hook winch 60 is much greater than the distance from the centerline of the hook winch 60 to an outer side of the drum. Depending on the length of the boom 40, the fleet angle of the hook cable 72 can be between 0.5° and 1.5°. This low fleet angle can allow the hook winch 60 to wind up the hook cable 72 or reeve nicely on the hook winch 70 without external manipulation (e.g. use of a fairlead sheave, etc) and prevent bird caging of the hook cable 72.

Another benefit of placing the hook winch 60 on the first side 22 of the main body 20 of the pipelayer machine 10 is that an operator of the pipelayer machine 10 in a cab of the pipelayer machine 10 can easily see the hook cable 72 and load block 74 without turning his or her head to the other side of the pipelayer machine 10 to see how the hook cable 72 is reeving on the hook winch 60 because the hook winch 60 will now be on the same side of the pipelayer machine 10 as the boom 40, allowing the operator to see the hook 70, hook cable 72 and hook winch 60 at the same time.

Figure 3:
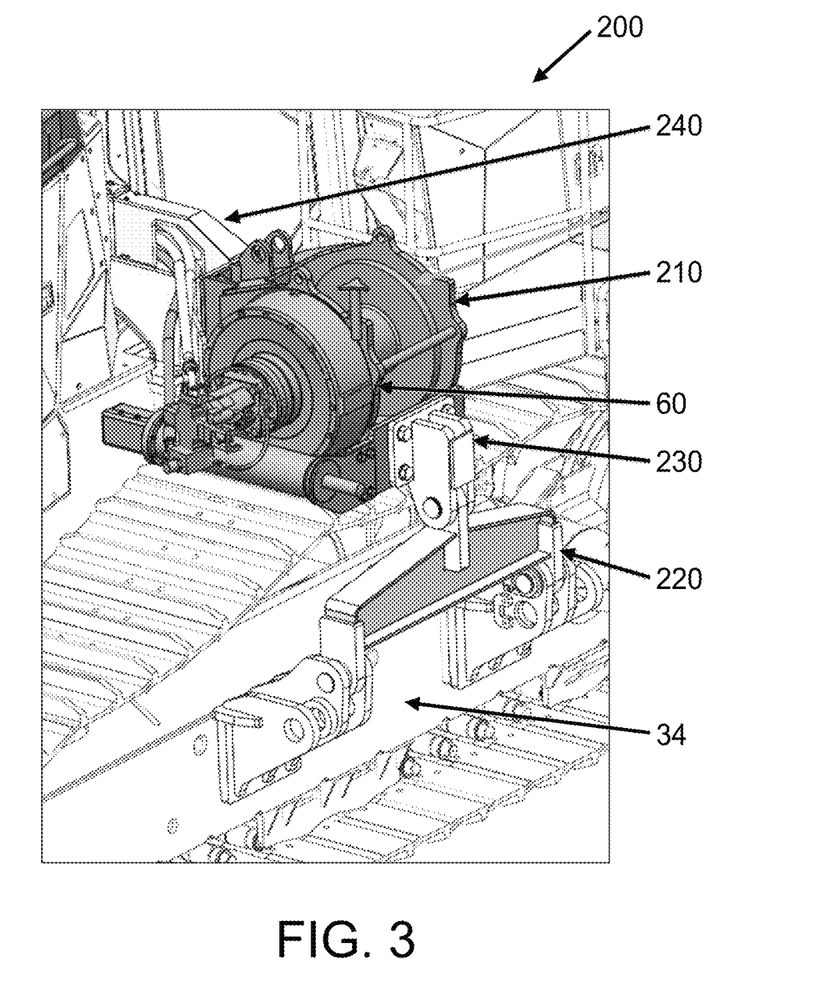
FIG. 3 is a close up view of a hook winch and a structural assembly mounting the hook winch on the pipelayer machine of FIG. 1.
Figure 4:
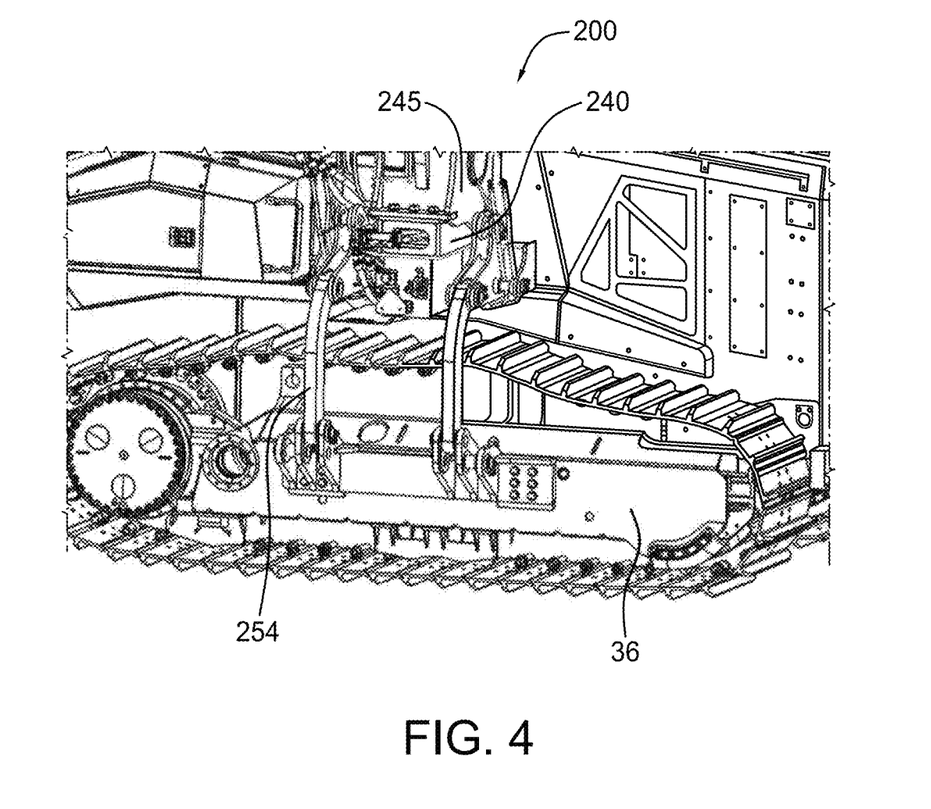
FIG. 4 is a close up view of the second side of the pipelayer machine and part of the structural assembly.

However, simply moving the location of the hook winch 60 to the first side 22 of the main body 20 of the pipelayer machine 10 can create issues with the operation of the pipelayer machine 10. To position the hook winch 60 on the first side 22 of the main body 20 of the pipelayer machine 10, the hook winch 60 is integrated into the frame of the pipelayer machine 10 using a structural assembly 200. Referring to FIGS. 3 and 4, a hook winch frame 210 of the hook winch 60 can be used to form a structural member in the structural assembly 200 that positions the hook winch 60 on the first side 22 of the main body 20 of the pipelayer machine 10. This unibody design of having the hook winch 60 integrated into the structural assembly 200, and thereby the frame of the pipelayer machine 10, allows for the load on the boom 40 to be transferred to the second side 22 of the main body 20 of the pipelayer machine 10. This allows the hook winch 60 to be in the right position for the hook cable 72 to reeve well onto the hook winch 60 while running directly to the load block 74 without a fairlead sheave being needed in between.

Because pipelayer machines are relatively compact pieces of equipment with multiple structures and subsystems which compete for limited amounts of available space aboard the pipelayer machine, the frame and other structural members must bear significant structural forces to lift the loads required during the operation of the pipelayer machine and in the dynamic work environment. Building a primary structural member and mounting a winch frame onto that member requires substantial space. By having the hook winch frame 210 of the hook winch 60 act as a primary load-bearing structural member in the structural assembly 200, the structural member 200 can be made more compact and reduce the space the structural assembly 200 requires, opening up space on the pipelayer machine for other components and improving component accessibility.

Figure 5:
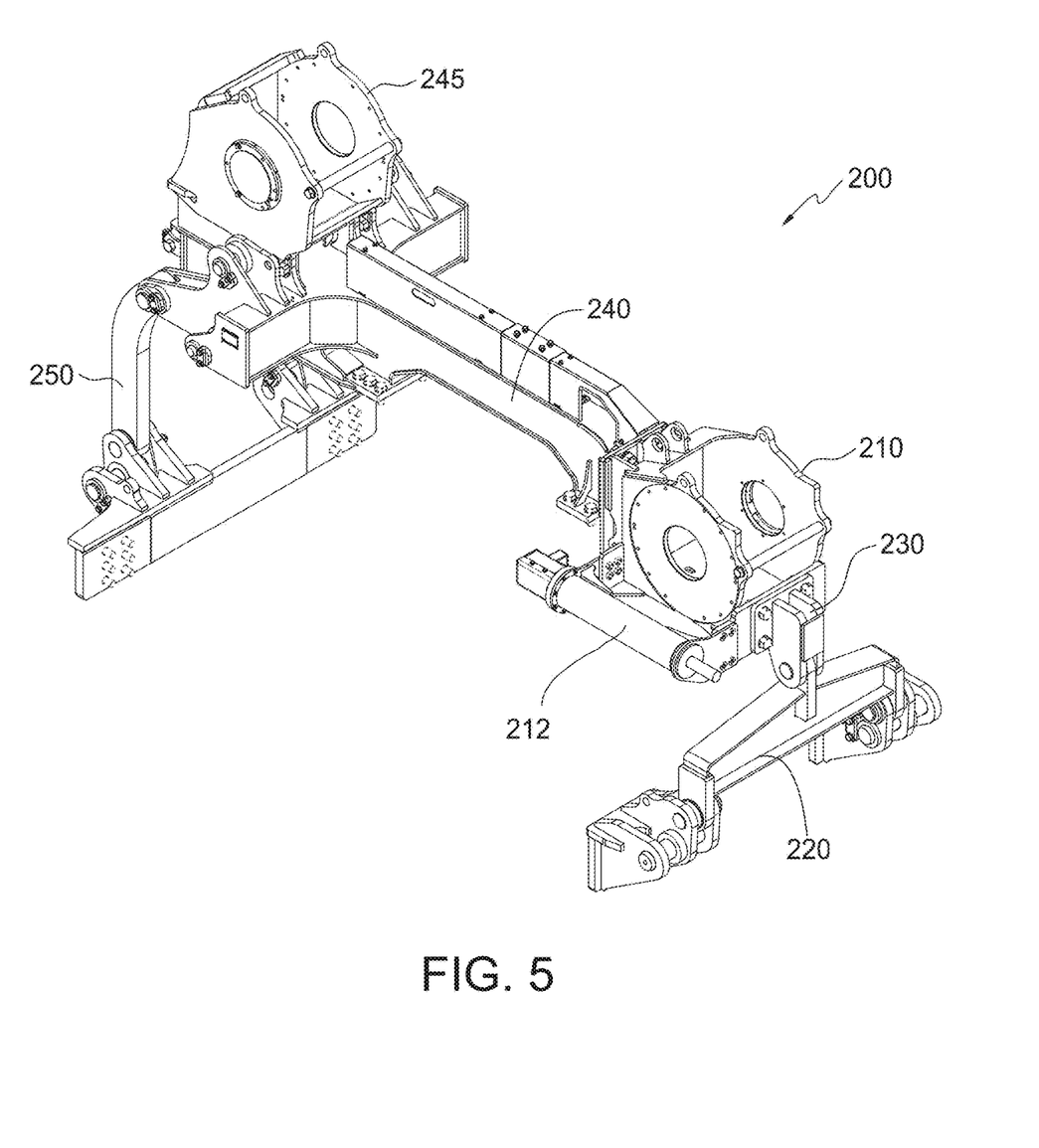
FIG. 5 is a perspective view of the structural assembly supports the hook winch.
Figure 6:
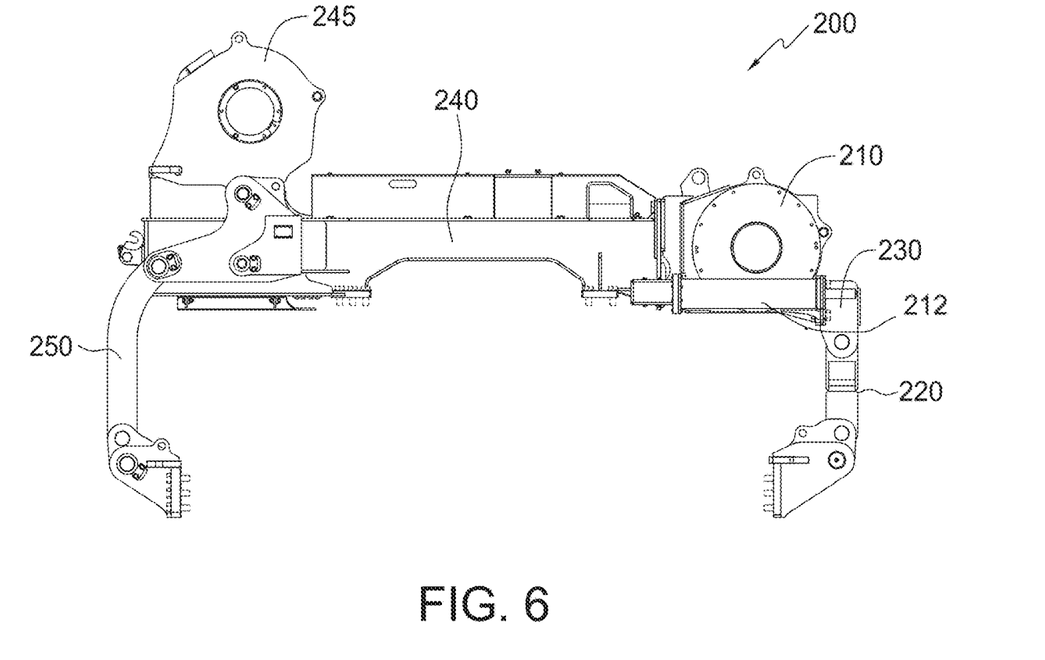
FIG. 6 is a front view of the structural assembly shown in FIG. 5.

Referring to FIGS. 5 and 6, the structural assembly 200 can include a first side track frame 220, a hook winch frame 210, a link mount 230, a work tool frame 240 and a second side track frame 250.

The first side track frame 220 can be connected at one end inside the first side track 34 on the first side 22 of the main body 20 as shown in FIG. 3. In one aspect, the first side track frame 220 can be attached to the inside of the first side track 34 in generally the same area that the proximal end 42 of the boom 40 is connected to the inside of the first side of the track 34. In one aspect, the first side track frame 220 can take the form of an A-frame member.

The link mount 230 can be connected between the other end of the first side track frame 220 and the hook winch frame 210 to operatively connect the hook winch frame 210 and the hook winch 60 to the first side track frame 220. Typically, the link mount 230 will be connected to a first side of the hook winch frame 210 containing the hook winch 60.

The work tool frame 240 can be connected at a first end to the hook winch frame 210 and the work tool frame 240 can extend across the main body 20 of the pipelayer machine 10 to the second side 24 of the main body 30 of the pipelayer machine 10. In one aspect, the work tool frame 240 can be connected to a second side of the hook winch frame 210, the opposite side of the hook winch frame 210 that the link mount 230 is connected to. In this manner, the hook winch 60 and particularly the hook winch frame 210 will form a structural member in the structural assembly 210 because the hook winch frame 210 will structurally connect the work tool frame 240 and first side track frame 220 together.

Hydraulic lines for connecting to the hook winch 60 in order to control the operation of the hook winch 60 can be run through a hollow interior of the work tool frame 240 so that these hydraulic lines can be run to and connected to the hook winch 60.

The second side of the work tool frame 240 can be connected to the second side track frame 250. The second side track 250 can operatively connect the work tool frame 240 to the inside of the second side track which in turn is connected to the inside of the second side track 36.

A boom winch frame 245 containing the boom winch 50 can be provided on the second end of the work tool frame 240 so that the boom winch 50 is positioned on the second side 24 of the main body 20 of the pipelayer machine 10.

In this manner, the structural assembly 210 can be connected from the inside of the first side track 34 to the inside of the second side track 36 securely connecting the hook winch frame 210 and the hook winch 60 to the frame of the pipelayer machine 10 and providing a secure mount for the hook winch 60. By using the structural assembly 210 to mount the hook winch 60, the forces applied to the pipelayer machine 10 can be better distributed to the pipelayer machine 10. It can also maintain the visibility of the hook 70 by the operator of the pipelayer machine 10, provide the necessary clearance for the pipelayer machine 10, the first side track 34 and the second side track 36, help balance the pipelayer machine 10 and provide the necessary clearance for the cab of the pipelayer machine 10.

In a further aspect, by mounting the boom winch 50 in the boom winch frame 245 and the hook winch 60 in the hook winch frame 210 and then incorporating quick-attachment points into the design of the boom winch frame 245, the hook winch frame 210 and the structural assembly 200, the time and labor needed for installation and uninstallation of the boom winch 50 and the hook winch 60 can be decreased.

Figure 7:
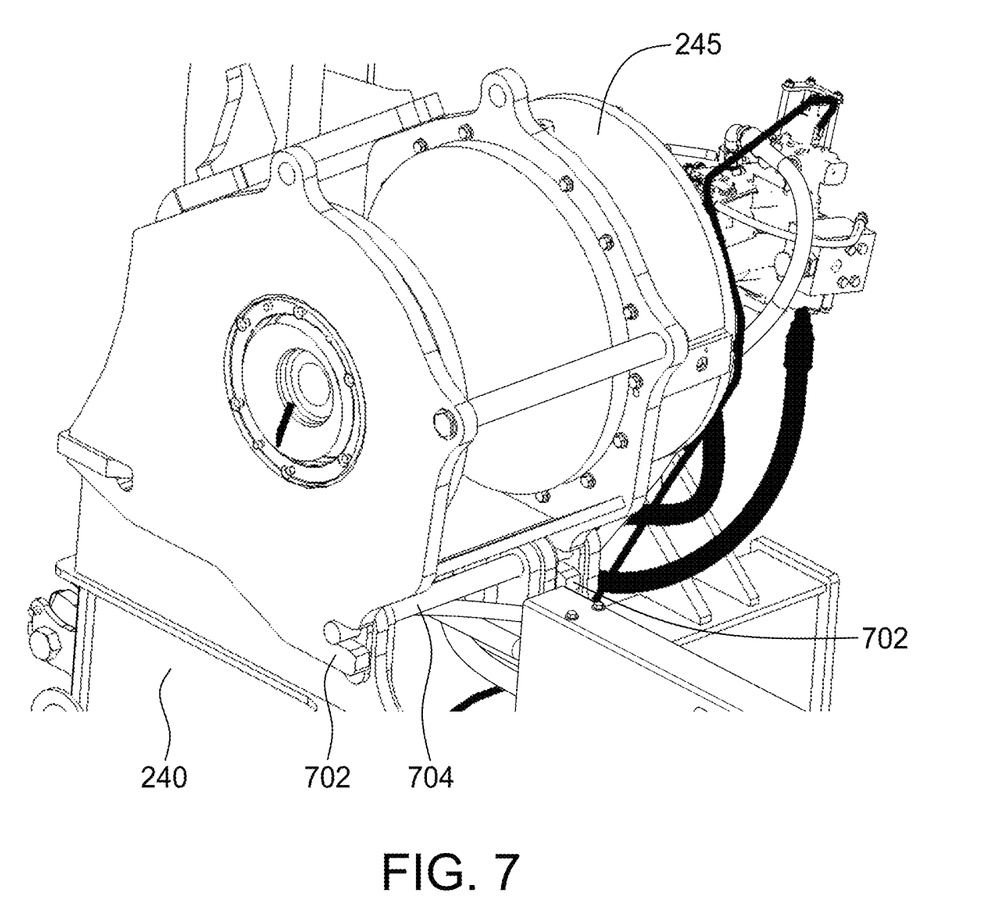
FIG. 7 is a perspective view of a quick attach mechanism for a boom winch frame.

Referring to FIG. 7, a quick-attach connection between the boom winch frame 245 and the work tool frame 240 is shown. The work tool frame 240 can be provided with a pin 704. Cradle lugs 702 can be provided on the boom winch frame 245 and these cradle lugs 702 can be sized and positioned on the boom winch frame 245 so that the pin 704 on the work tool frame 240 can be inserted into the cradle lugs 702. When the pin 704 is inserted into the cradle lugs 702 on the hook winch frame 210, the hook winch frame 245 can be secured to the work tool frame 240 partially by the cradle lugs 702 and the pin 704.

Figure 8:
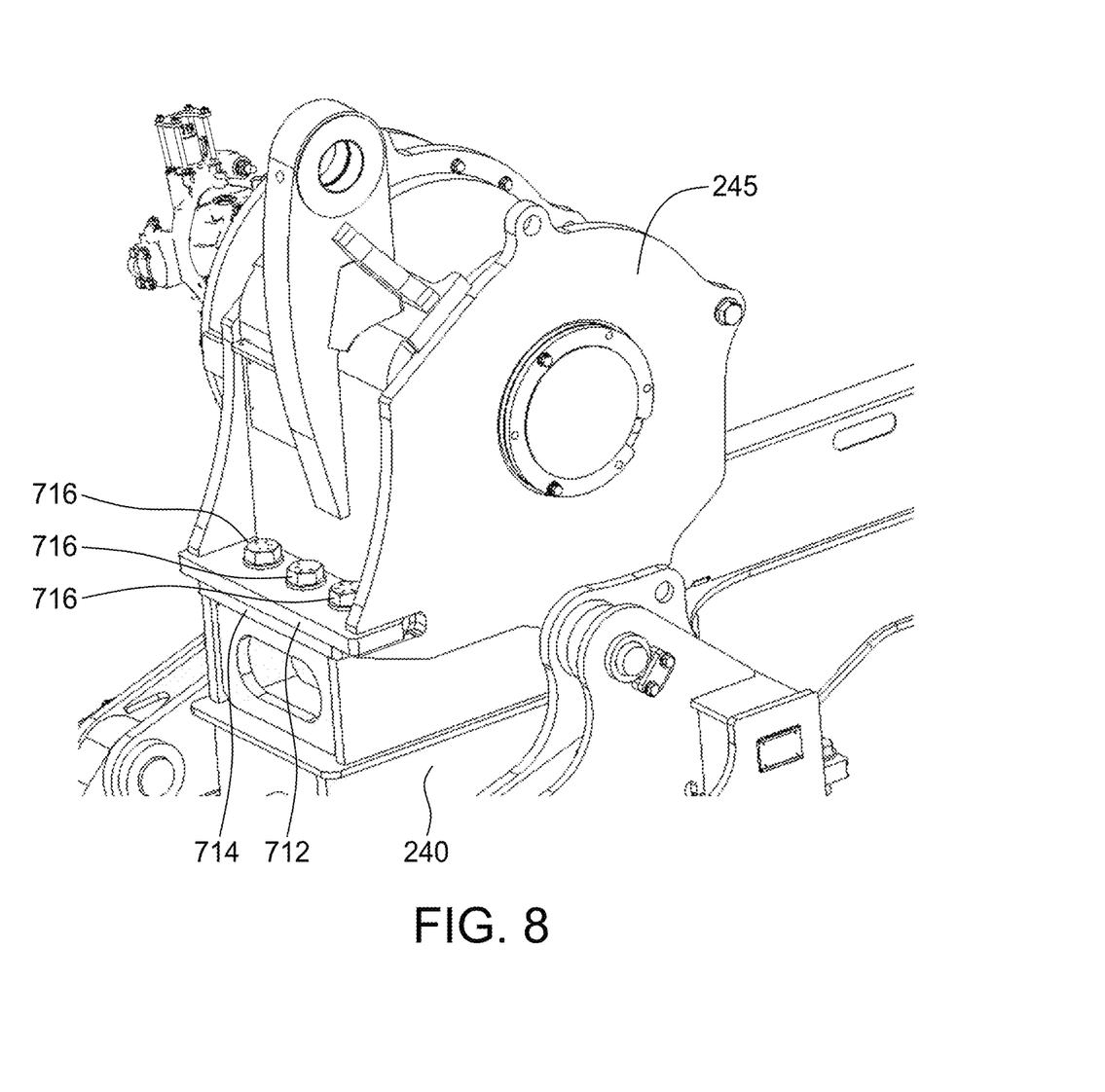
FIG. 8 is a perspective rear view of the quick attach mechanism for the boom winch frame shown in FIG. 7.

Referring to FIG. 8, with the pin 704 of the work tool frame 240 inserted in the cradle lugs 702 of the boom winch frame 245, the boom winch frame 245 can be pivoted so that a mounting flange 712 on the boom winch frame 245 can come into contact with a mounting flange 714 on the work tool frame 240. Flange bolts 716 can then be used to secure the mounting flange 712 of the boom winch frame 245 against the mounting flange 714 of the work tool frame 240. In this manner, the pin 704 provides a close fit to the cradle lugs 702 on the boom winch frame 245 and forms a physical connection between the pin 704 and the cradle lugs 702 partially securing the boom winch frame 245 to the work tool frame 240. The mounting flange 712 on the boom winch frame 245 and the mounting flange 714 on the work tool frame 240 can form another physical connection with the flange bolts 716 securing them together.

Figure 9:
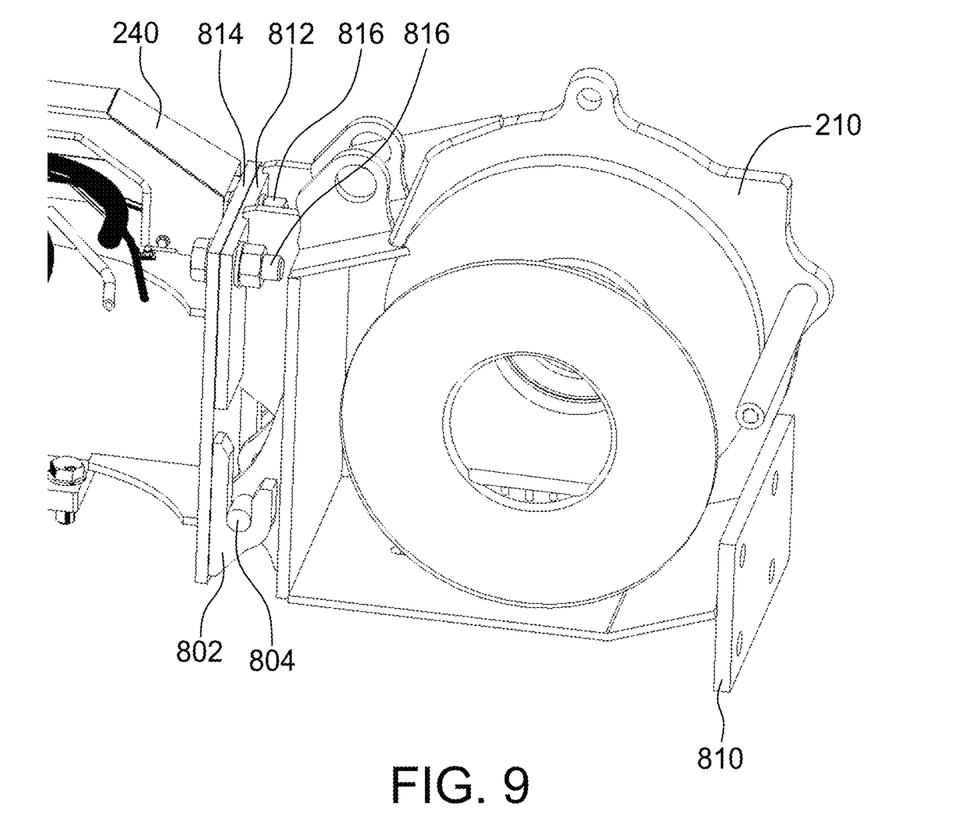
FIG. 9 is a perspective view of a quick attach mechanism for a hook winch frame.

Referring to FIGS. 8 and 9, with the physical connection between the pin 704 on the work tool frame 240 and the cradle lugs 702 on the hook winch frame 245, a second row of flange bolts to secure the hook winch frame 245 to the work tool frame 240 is unnecessary, reducing the number of bolts required to secure the hook winch frame 245 to the work tool frame 240. The time and labor required for installation of the boom winch frame 245 onto the work tool frame 240 is thus decreased through the reduction in the number of fasteners that need to be installed and torqued, and by the pin 704 and lug cradles 702 fit allowing the boom winch frame 245 to be set into the cradle lugs 702 which properly position the boom winch frame 245 in place without need for further adjustments. The time and labor needed for the removal of the boom winch frame 245 is similarly decreased by the reduction in fasteners and self-aligning nature of the pin 704 and cradle lugs 702 connection.

Referring to FIG. 9, a quick-attach connection between the boom winch frame 245 and the work tool frame 240 is shown. The hook winch frame 210 can be provided with a pin 804. Cradle lugs 802 on the first end of the work tool frame 240 can be sized and positioned to correspond with the pin 804 on the hook winch frame 210 when the hook winch frame 210 is positioned in the structural assembly 200. The cradle lugs 802 can be sized to accept the pin 804 so that the pin 804 can be placed in the cradle lugs 802 on the first end of the work tool frame 240. With the pin 804 of the hook winch frame 210 inserted in the cradle lugs 802 on the first end of the work tool frame 240, the hook winch frame 210 can be pivoted so that a mounting flange 812 on the hook winch frame 210 can come into contact with a mounting flange 814 on the first end of the work tool frame 240. Flange bolts 816 can then be used to secure the mounting flange 812 of the hook winch frame 210 against the mounting flange 814 of the work tool frame 240. In this manner, the pin 804 provides a close fit to the cradle lugs 802 on the work tool frame 240 and forms a physical connection between the pin 804 and the cradle lugs 802 partially securing the hook winch frame 210 to the first end of the work tool frame 240. The mounting flange 812 on the hook winch frame 210 and the mounting flange 814 on the first end of the work tool frame 240 can form another physical connection with the flange bolts 816 securing them together.

With the hook winch frame 210 secured to the work tool frame 240, the link mount 230 can be attached to the hook winch frame 210 using the mounting flange 810 on the other side of the hook winch frame 210.

The use of the pin 804 and the cradle lugs 80 removes the necessity for a bottom row of flange bolts. The time and labor for installation of the hook winch frame 210 onto the work tool frame 240 is thus decreased through the reduction in the number of fasteners that need to be installed and torqued, and by the pin 804 and cradle lugs 801 fit allowing the hook winch frame 210 to be lowered into the cradle lugs 802 which will properly align and position the hook winch frame 210 in place without need for further adjustments. Removal of the hook winch frame 210 is similarly reduced by the reduction in fasteners and the self-supporting nature of the pin 804 in cradle lug 802 connection.

In one aspect, the boom stop 212 for the boom 40 can be integrated into the frame 210 of the hook winch 60 allowing for a more compact overall design and making it easily accessible for maintenance.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A structural assembly for positioning a hook winch and a boom winch on opposite sides of a pipelayer machine, the structural assembly comprising:
   a first side track frame connectable inside a first side track of the pipelayer machine;
   a link mount operatively connected to the first side track frame a hook winch frame for supporting the hook winch, the hook winch frame connected at a first side to the link mount;

a work tool frame is connected at a first end to a second side of the hook winch frame and positioned to extend across a main body of the pipelayer machine; and a second side track frame connectable inside a second side track of the pipelayer machine and a second end of the work tool frame, wherein the work tool frame partially connects to the first end of the hook winch frame using a pin and at least one cradle lug.

2. The structural assembly of claim 1 wherein the hook winch frame forms a structural member in the structural assembly.

3. The structural assembly of claim 1 wherein the boom winch frame is attached to the work tool frame proximate the second end of the work tool frame.

4. The structural assembly of claim 3 wherein the wherein the tool frame partially connects to the boom winch frame using a pin and at least one cradle lug.

5. The structural assembly of claim 1 wherein the work tool frame has a hollow interior and hydraulic lines pass through the hollow interior of the work frame to the hook winch.

6. The structural assembly of claim 1 wherein a boom stop is provided on the hook winch frame.

7. The structural assembly of claim 1 wherein the hook winch frame forms a structural member in the structural assembly.

8. The structural assembly of claim 1 wherein the work tool frame partially connects to the first end of the hook winch frame using a pin and at least one cradle lug.

9. The structural assembly of claim 1 wherein the boom winch frame is attached to the work tool frame proximate the second end of the work tool frame.

10. The structural assembly of claim 9 wherein the wherein the tool frame partially connects to the boom winch frame using a pin and at least one cradle lug.

11. The structural assembly of claim 1 wherein a boom stop is provided on the hook winch frame.

12. A structural assembly for positioning a hook winch and a boom winch on opposite sides of a pipelayer machine, the structural assembly comprising:

a first side track frame connectable inside a first side track of the pipelayer machine;

a link mount operatively connected to the first side track frame a hook winch frame for supporting the hook winch, the hook winch frame connected at a first side to the link mount;

a work tool frame is connected at a first end to a second side of the hook winch frame and positioned to extend across a main body of the pipelayer machine; and a second side track frame connectable inside a second side track of the pipelayer machine and a second end of the work tool frame, wherein the boom winch frame is attached to the work tool frame proximate the second end of the work tool frame, and wherein the tool frame partially connects to the boom winch frame using a pin and at least one cradle lug.

13. The structural assembly of claim 12 wherein the hook winch frame forms a structural member in the structural assembly.

14. The structural assembly of claim 12 wherein the work tool frame partially connects to the first end of the hook winch frame using a pin and at least one cradle lug.

15. The structural assembly of claim 12 wherein the work tool frame has a hollow interior and hydraulic lines pass through the hollow interior of the work frame to the hook winch.

16. The structural assembly of claim 12 wherein a boom stop is provided on the hook winch frame.

17. A structural assembly for positioning a hook winch and a boom winch on opposite sides of a pipelayer machine, the structural assembly comprising:

a first side track frame connectable inside a first side track of the pipelayer machine;

a link mount operatively connected to the first side track frame a hook winch frame for supporting the hook winch, the hook winch frame connected at a first side to the link mount;

a work tool frame is connected at a first end to a second side of the hook winch frame and positioned to extend across a main body of the pipelayer machine; and a second side track frame connectable inside a second side track of the pipelayer machine and a second end of the work tool frame, wherein the work tool frame has a hollow interior and hydraulic lines pass through the hollow interior of the work frame to the hook winch.

* * * * *